United States Patent [19]

Sato et al.

[11] 4,439,832

[45] Mar. 27, 1984

[54] METHOD AND APPARATUS FOR CONTROLLING AN ANTI-SKID BRAKE SYSTEM

[75] Inventors: Makoto Sato, Fukuoka; Yoshikazu Tsuchiya, Fujimi; Taiji Ohmori, Kawagoe, all of Japan

[73] Assignee: Honda Giken Kogyo Kabushiki Kaisha, Tokyo, Japan

[21] Appl. No.: 295,009

[22] Filed: Aug. 21, 1981

[30] Foreign Application Priority Data

Aug. 25, 1980 [JP] Japan .................................. 55-116739
Sep. 2, 1980 [JP] Japan .................................. 55-121592

[51] Int. Cl.$^3$ ............................................... B60T 8/02
[52] U.S. Cl. ..................................... 364/426; 303/97; 303/98; 303/111
[58] Field of Search ..................... 364/426; 303/93, 94, 303/95, 96, 97, 104, 111

[56] References Cited

U.S. PATENT DOCUMENTS

| | | | |
|---|---|---|---|
| 3,532,392 | 10/1970 | Scharlack | 303/104 X |
| 3,532,393 | 10/1970 | Riordan | 303/104 X |
| 4,140,353 | 2/1979 | Riordan | 303/97 |
| 4,291,924 | 9/1981 | Lieber et al. | 303/111 |

Primary Examiner—J. V. Truhe
Assistant Examiner—Saul M. Bergmann
Attorney, Agent, or Firm—Posnack, Roberts, Spiecens & Cohen

[57] ABSTRACT

A method and apparatus for controlling an anti-skid brake in a vehicle, in which an estimated vehicle speed signal is obtained by selecting the higher value signal from wheel speed signals of the front and rear wheels at the left and right side and anti-skid brake devices for the front and rear wheels are independently controlled by independent signals. In this way, the anti-skid brake control can always be performed assuredly while preventing locking of the wheels on slippery roads while also preventing unnecessary anti-skid braking operations at the time of sharp turning. In a modified method and apparatus, control of the anti-skid brake of the rear wheel on the left or right side is effected according to vehicle speed estimated from the speed of a front wheel on the right or left side, whereby gradual locking of the wheels at the time of braking on a slippery road is prevented, and the anti-skid brake control can always be accomplished assuredly and excellent braking effects can always be obtained.

14 Claims, 6 Drawing Figures

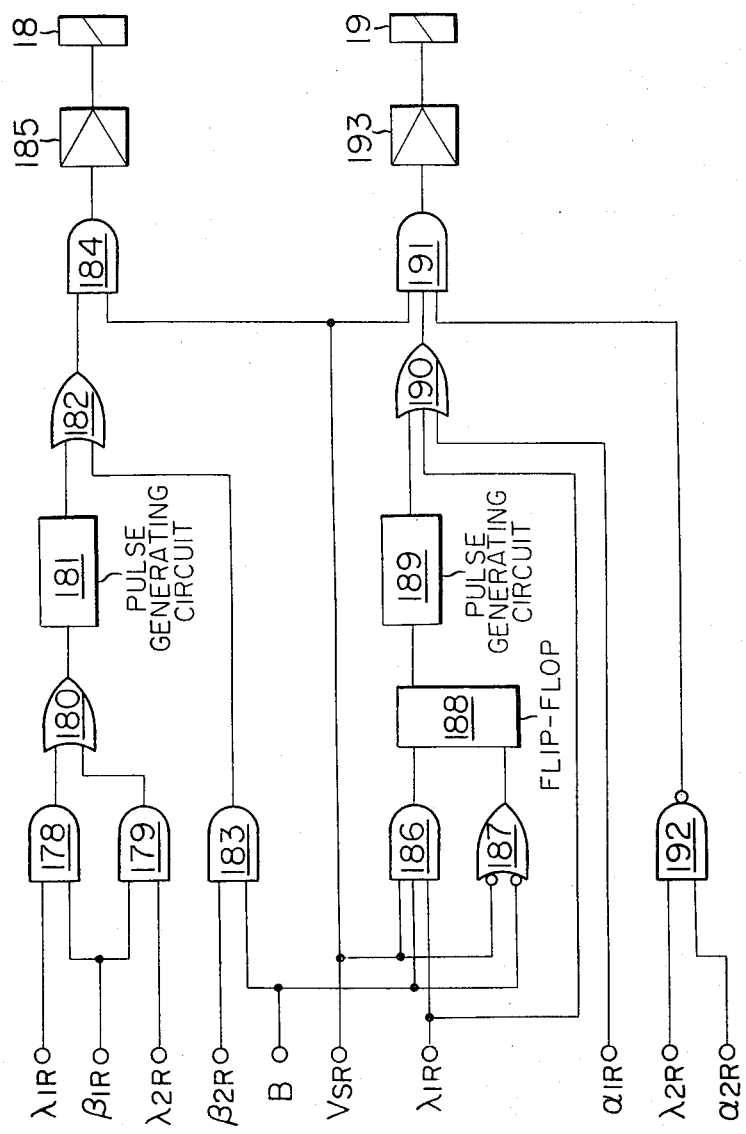

METHOD AND APPARATUS FOR CONTROLLING AN ANTI-SKID BRAKE SYSTEM

FIELD OF THE INVENTION

The present invention relates to a method and apparatus for controlling an anti-skid brake system in a vehicle, in which the braking efficiency is enhanced by preventing locking of wheels at the time of braking the vehicle.

PRIOR ART

In an ordinary anti-skid brake device, a controlling hydraulic pressure chamber is disposed to supply a high-pressure hydraulic oil into a hydraulic pressure controlling device for braking wheels in which hydraulic braking pressure produced by a master cylinder is supplied to a wheel cylinder, whereby the operation of the wheel cylinder is controlled in accordance with the hydraulic pressure produced in the master cylinder, and when the braking torque is too large and there is a risk of locking of the wheels or the wheels are going to be locked, the hydraulic pressure in the controlling hydraulic pressure chamber of the brake device is controlled by a controlling hydraulic pressure circuit detecting this too large braking torque for producing a controlling hydraulic pressure, so that the braking torque to be applied to the wheels is reduced or maintained at a constant level. This controlling hydraulic pressure circuit comprises a normally closed inlet valve to be changed over and controlled by an electromagnetic coil, which is disposed between a high pressure hydraulic source of said circuit and the controlling hydraulic pressure chamber of the brake device. Furthermore, the controlling hydraulic pressure circuit comprises a normally closed outlet valve to be changed over and controlled by an electromagnetic coil, which is disposed between the controlling hydraulic pressure chamber of the brake device and an oil tank exposed to atmospheric pressure.

In the anti-skid brake device having the above-mentioned structure, in the normal state where no signal is supplied to any of the electromagnetic coils, the controlling hydraulic pressure chamber of the brake device is isolated from the hydraulic pressure source of the controlling hydraulic pressure circuit but is in communication with the oil tank, and therefore, the braking torque applied to the wheels is changed according to the braking operation of the driver. When the risk of locking of the wheels arises and a signal is supplied to the electromagnetic coil of the outlet valve, this outlet valve is closed and the controlling hydraulic pressure chamber is also isolated from the oil tank. Accordingly, the hydraulic oil is locked in the controlling hydraulic pressure chamber and the braking torque is maintained at a predetermined level irrespective of the braking operation of the driver. When the wheels are going to be locked and signals are fed to both of the electromagnetic coils, the inlet valve is opened and simultaneously, the outlet valve is closed, whereby the high-pressure hydraulic oil is supplied under pressure into the controlling hydraulic pressure chamber from the hydraulic pressure source of the controlling hydraulic pressure circuit and simultaneously, the controlling hydraulic pressure chamber is isolated from the oil tank. Accordingly, the pressure in the wheel cylinder is reduced in comparison with the hydraulic pressure produced in the master cylinder. Namely, the braking torque is reduced irrespective of the braking operation of the driver.

In the anti-skid brake device having the above-mentioned structure, therefore, by appropriately controlling the timings of feeding signals to the electromagnetic coils for opening and closing the inlet valve and outlet valve, control of the anti-skid brake can be accomplished. As the method of accomplishing this control, there has been considered a method in which there are produced reference signals including a first reference wheel speed signal VR1 indicating the peripheral speed of the wheel, the level of which is lower than the vehicle speed, a second reference wheel speed signal VR2 determined by taking the slip rate of the wheel into account, the level of which is lower than VR1, a first reference wheel acceleration signal Vw1 indicating a positive peripheral acceleration of the wheel, a second reference wheel acceleration signal Vw2, the level of which is higher than Vw1, and a reference wheel deceleration signal $-$Vw3 indicating a negative peripheral acceleration of the wheel. When the peripheral speed Vw of the wheel is in the range of VR1>Vw>VR2 at the time of braking, signals are fed to both of the electromagnetic coils at the instant when the level of the wheel peripheral acceleration signal Vw is lower than $-$Vw3. Feeding of the signal to the electromagnetic coil for the inlet valve is stopped at the instant when the signal Vw increases and exceeds $-$Vw3, and when Vw becomes lower than VR2, signals are fed to both the electromagnetic coils until Vw increases and exceeds Vw1. According to this method, in the case where the braking operation is effected while the vehicle runs on a high friction road, at the instant when the level of the wheel acceleration signal Vw becomes higher than the level of the reference wheel deceleration signal $-$Vw3, reduction of the braking torque is stopped, and therefore, excessive reduction of the braking torque is prevented and the braking distance can be shortened by increase of the braking efficiency. Furthermore, when the vehicle is in a braked state and comes onto a slippery road from the high friction road, reduction of the braking torque is continued until the reduced wheel acceleration signal Vw is increased and its level becomes higher than the level of the first reference wheel acceleration signal Vw1, that is, until the wheel acceleration is sufficiently restored. Accordingly, locking of the wheels due to excessive reduction of the wheel speed can be positively obviated.

In such anti-skid brake controlling method, in order to set the first reference wheel speed signal VR1 at a level lower than the vehicle speed and also set the second reference wheel speed signal VR2 at a level lower than the level of the first reference wheel speed signal VR1 so that the ratio of the second reference wheel speed signal to the vehicle speed is less than 30% (the slip rate is higher than 70%), it is necessary to detect the vehicle speed. However, no practical means for directly detecting the speed of the vehicle in the braked state has been developed. Accordingly, the vehicle speed is ordinarily assumed on the basis of the wheel speed precisely detected by a speed sensor attached to the wheel. Such assumption of the vehicle speed includes a method in which the peak value of the vehicle speed is stored, when the deceleration of the wheel is lower than the predetermined deceleration, namely when the peripheral speed of the wheel is gradually reduced, it is assumed that the speed of the vehicle is reduced at the same rate as the rate of reduction of the speed of the wheel, when the peripheral speed of the wheel is abruptly reduced, it is assumed that the speed of the vehicle is reduced according to the predetermined deceleration, and the speed of the vehicle is determined on the basis of these assumptions. In this method of determining the speed of the vehicle, the estimated value of the vehicle speed should be corrected based on the peak value of the wheel speed for every cycle of the change of the wheel speed. For this purpose, the predetermined deceleration should be set at a level higher than the practical vehicle deceleration. The maximum value of the practical vehicle deceleration is about 1.0 G (G stands for the acceleration of gravity). Accordingly, the predetermined deceleration is ordinarily set within the range of from 1.0 to 1.2 G. On a very slippery road such as a frozen road, the practical vehicle deceleration is often lower than 0.2 G. In such case, if a braking torque is on a critical border line between the torque locking the wheel and the torque not locking the wheel, the wheel deceleration is sometimes lower than the predetermined deceleration though the wheel deceleration is considerably higher than the actual vehicle deceleration. According to the above-mentioned vehicle speed determining method, also in this case, it is presumed that the vehicle deceleration is equal to the wheel deceleration, and a signal for reducing the braking torque is not produced. Accordingly, the anti-skid braking function cannot be exerted and the wheels are locked before the vehicle is stopped.

As a means for preventing occurrence of this undesirable phenomenon, there may be considered a method in which detection of the wheel speed is effected on a plurality of wheels and the frequency of correction of the presumed vehicle speed is increased to enhance the precision of determination of vehicle speed. The above-mentioned phenomenon in which the wheel deceleration is lower than the predetermined deceleration and the wheels are gradually locked takes place only when the vehicle is braked on a slippery road where the precision of presumption of the vehicle speed is low. Ordinarily, the braking torque is distributed to the front and rear wheels so that the front and rear wheels are simultaneously locked on a tractable road having a high friction coefficient. Accordingly, in the case where the above-mentioned phenomenon takes place on the rear wheels on a slippery road having a low friction coefficient, the braking input is enough to abruptly lock the front wheels. Furthermore, in the case where such phenomenon takes place on the front wheels, the braking input is not enough to lock the rear wheels. Accordingly, the above-mentioned phenomenon does not simultaneously take place on both the front wheels and the rear wheels.

In view of the foregoing, it is considered that if the speeds of the front and rear wheels on the right side (or the front and rear wheels on the left side) are detected and a higher speed is selected and adopted for presumption of the vehicle speed, the estimated vehicle speed can be obtained with high precision and the anti-skid braking function can be exerted sufficiently.

However, when such method alone is adopted, on sharp turning at low speed, a considerable speed difference is brought about between the front and rear wheels on the right side (or on the left side) though this speed difference is not so great as the speed difference between the inner and outer wheels, and even if there is no risk of locking, slip or the like is caused and a braking torque-reducing signal is produced to reduce the braking efficiency. This can be prevented by setting the second reference wheel speed signal while adopting a high slip rate. If this method is adopted, however, the anti-skid braking function in the normal state is reduced.

SUMMARY OF THE INVENTION

It is therefore a primary object of the present invention to provide a method of controlling an anti-skid brake system in a vehicle, in which by using a vehicle speed with a high presumption precision, which is obtained by selecting a higher speed signal from wheel speed signals of the front and rear wheels on the right side (or the left side), gradual locking of the wheels at the time of braking on a highly slippery road is prevented and an unnecessaruy anti-skid braking operation at the time of sharp turning is prevented, whereby control of the anti-skid brake can always be accomplished assuredly and a very excellent braking effect can always be obtained.

In the case where the wheel deceleration is between the actual vehicle deceleration and the predetermined deceleration, since the estimated vehicle speed is equal to the wheel speed, the level of the wheel peripheral speed signal Vw is not lower than VR1 or VR2 and the estimated vehicle speed does not indicate the actual vehicle speed, and therefore, the above-mentioned phenomenon takes place. Accordingly, occurrence of the above-mentioned phenomenon can be prevented if the precision of determination of the vehicle speed for setting the second reference wheel speed signal VR2 in the conventional anti-skid brake controlling method is improved. As the result of tests made by us, it was found that the phenomenon in which the wheel deceleration is between the actual vehicle deceleration and the predetermined deceleration and the wheels are gradually locked takes place only on the rear wheels. More specifically, in the case of the front wheels, the brake capacity relative to the moment of inertia of the wheel is much larger than in case of the rear wheels, and it is believed that even if a slightly excessive braking input is applied, drastic reduction of the speed of the wheels is caused. Accordingly, if the second reference wheel signal VR2 is set by using the vehicle speed determined from the speed of the front wheel on the right side (or on the left side) and the anti-skid brake control of the front and rear wheels on the right side (or on the left) is performed based on this second reference wheel speed signal VR2, occurrence of the above-mentioned phenomenon of gradual locking of the wheels can be prevented.

It is therefore a secondary object of the present invention to provide a method of controlling an anti-skid brake system in a vehicle, in which control of an anti-skid system of a rear wheel on the right or left side is performed according to a vehicle speed determined from the speed of a front wheel on the right or left side, whereby gradual locking of wheels at the time of braking on a slippery road is prevented, and the anti-skid brake control can always be accomplished assuredly and a very excellent braking effect can always be obtained.

More specifically, in accordance with a first fundamental aspect of the present invention, there is provided a method of controlling an anti-skid brake system in a vehicle, which comprises comparing a front wheel speed signal VwF indicating the peripheral speed of a front wheel and a rear wheel speed signal VwR indicating the peripheral speed of a rear wheel at the time of braking the vehicle, with a first reference wheel speed signal VR1, the level of which is lower than the vehicle speed, and a second reference wheel speed signal VR2 determined by taking the slip rate of the wheels into account together with a vehicle speed signal V presumed by selecting a higher value from the front wheel speed signal VwF and the rear wheel speed signal VwR, the level of said second reference wheel speed signal VR2 being lower than the level of said first reference wheel speed signal VR1, comparing a front wheel acceleration signal VwF indicating the peripheral acceleration of the front wheel and a rear wheel acceleration signal VwR indicating the peripheral acceleration of the rear wheel, with a first reference wheel acceleration signal Vw1 indicating a certain positive wheel acceleration, a second reference wheel acceleration signal Vw2, the level of which is higher than the level of the first reference wheel acceleration signal and a reference wheel deceleration signal −Vw3 indicating a certain negative wheel acceleration, reducing the braking torque on the front wheel or rear wheel when the level of the front wheel speed signal VwF or rear wheel speed signal VwR is lower than the level of the first reference wheel speed signal VR1 and higher than the level of the second reference wheel speed signal VR2 and the level of the front wheel acceleration signal VwF or rear wheel acceleration signal VwR is lower than the level of the reference wheel deceleration signal −Vw3, and reducing the braking torque on the front wheel or rear wheel when the level of the front wheel signal VwF or rear wheel speed signal VwR is lower than the level of the second reference wheel speed signal VR2, until the level of the front wheel acceleration signal VwF or rear wheel acceleration signal VwR becomes higher than the level of the first reference wheel acceleration signal Vw1.

In accordance with a second fundamental aspect of the present invention, there is provided a method of controlling an anti-skid brake system in a vehicle, which comprises detecting the peripheral speeds of the front and rear wheels on the right or left side, picking up said peripheral speeds as a front wheel speed signal VwF and a rear wheel speed signal VwR, determining estimated vehicle speed signals VF and VR and front wheel and rear wheel acceleration signals VwF and VwR from said wheel speed signals VwF and VwR, setting a first reference wheel acceleration signal Vw1 and a first reference deceleration signal −Vw3 in forms comparable with said front and rear wheel acceleration signals VwF and VwR, obtaining a first reference wheel speed signal VR1 determined by taking a certain slip rate into account together with said estimated vehicle speed signals VF and VR, in a form comparable to said front and rear wheel speed signals VwF and VwR, obtaining second reference wheel speed signals VR2 and VR'2 determined by taking a slip rate higher than the slip rate for the first reference wheel speed signal VR1 into account together with said estimated vehicle speed signal VF estimated from said front wheel speed signal VwF, in forms comparable to said front and rear wheel speed signals VwF and VwR, comparing said front and rear speed signals VwF and VwR with said first reference wheel speed signal VR1 and second reference wheel speed signals VR2 and VR'2 at the time of braking the vehicle, further comparing said front and rear wheel acceleration signals VwF and VwR with said first reference wheel acceleration signal Vw1 and said first reference wheel deceleration signal −Vw3, and controlling a brake device to reduce the braking torque on the front or rear wheel when the level of said wheel speed signal VwF or VwR is lower than the level of said first reference wheel speed signal VR1 and simultaneously, the level of said wheel acceleration signal VwF or VwR is lower than the level of said first reference wheel deceleration signal −Vw3 or when the level of said wheel speed signal VwF or VwR is lower than the level of said second reference wheel speed signal VR2 or VR'2 and simultaneously, the level of said wheel acceleration signal VwF of VwR is lower than the level of said first reference wheel acceleration signal Vw1.

The present invention will now be described in detail with reference to embodiments illustrated in the accompanying drawings.

BRIEF DESCRIPTION OF THE DRAWINGS

FIG. 6 is a circuit diagram of a control circuit for controlling an anti-skid brake device of the rear wheels.

DETAILED DESCRIPTION OF SEVERAL VIEWS OF THE DRAWING

Figure 1:
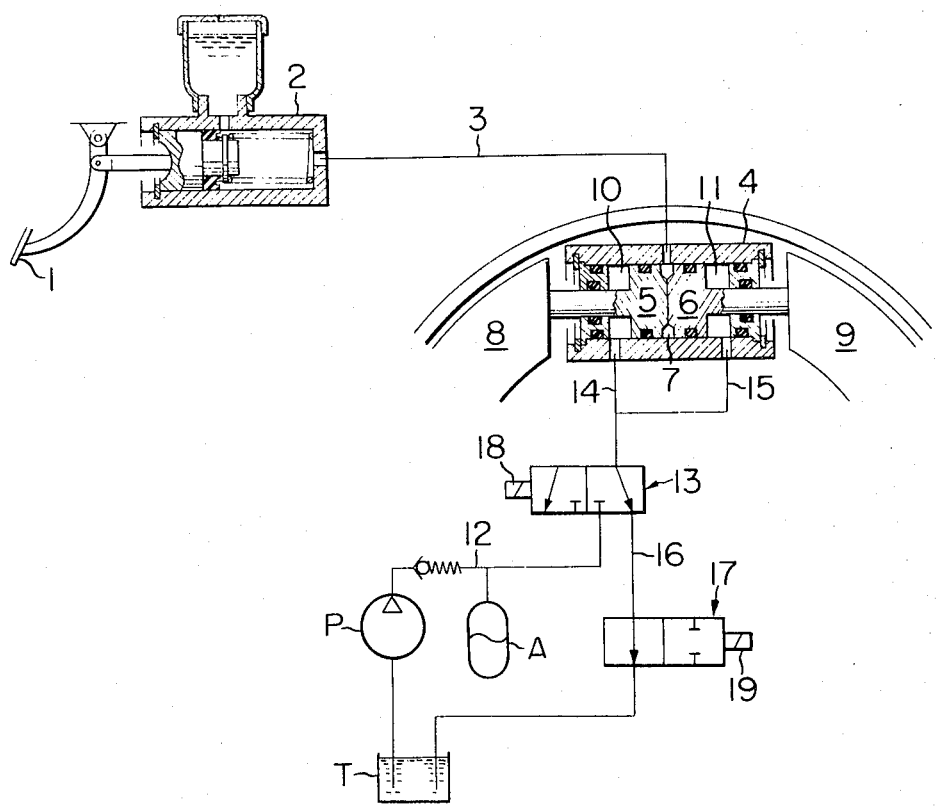
FIG. 1 is a hydraulic pressure circuit diagram illustrating one embodiment of the anti-skid brake device for use in practicing the method of the present invention.

Referring to FIG. 1, a brake pedal 1 is operatively connected to a master cylinder 2, and when the brake pedal 1 is depressed by a driver, a braking hydraulic pressure is produced by the master cylinder 2. The master cylinder 2 is connected through an oil passage 3 with a braking hydraulic pressure chamber 7 formed between a pair of pistons 5 and 6 in a wheel cylinder 4 mounted on a vehicle body. The pistons 5 and 6 are connected to a pair of brake shoes 8 and 9, respectively, which are attached to wheels to generate braking torques by frictional contact with a brake drum. Accordingly, when the braking hydraulic pressure is produced by the master cylinder 2 by the operation of the brake pedal 1, this braking hydraulic pressure is transmitted to the braking hydraulic pressure chamber 7 through the oil passage 3, with the result that the pistons 5 and 6 are pressed and moved so that they are separated from each other, and the brake shoes 8 and 9 are pressed against the brake drum to produce the braking torques applied to the wheels.

If the braking hydraulic pressure in the braking hydraulic pressure chamber 7 is too high, the braking torques produced between the brake shoes 8 and 9 and the brake drum become too large and therefore, the wheels are locked. In order to prevent this locking, a pair of control hydraulic pressure chambers 10 and 11 are formed between the pistons 5 and 6 and the end walls of the wheel cylinder 4, respectively, and when there is a possibility or risk of locking of the wheels, by controlling the control hydraulic pressures in these control hydraulic pressure chambers 10 and 11, the movements of the pistons 5 and 6 by the braking hydraulic pressure are controlled.

The control hydraulic pressure circuit for controlling the control hydraulic pressures in the control hydraulic pressure chambers 10 and 11 will now be described.

A compressed control oil sucked from an oil tank T by a hydraulic pressure pump P is supplied to a pressure accumulator A through an oil passage 12 and also to one outlet port or an inlet valve 13 to be changed over and controlled by an electromagnetic coil 18. The inlet valve 13 is a two-way changeover valve comprising two outlet ports and one inlet port. The inlet port is connected to the control hydraulic pressure chambers 10 and 11 through oil passages 14 and 15, respectively. The other output port of the inlet valve 13 is connected through an oil passage 16 with an inlet port of an outlet valve 17 to be changed over and controlled by an electromagnetic coil 19, and an outlet port of the outlet valve 17 is connected to the oil tank T.

The outlet valve 17 is a conventional switch valve, and in the normal state, the valve 17 is switched to the right position as shown in FIG. 1. In this state, the oil passage 16 is opened to the oil tank T. If a signal is fed to the electromagnetic coil 19 and the coil 19 is actuated, the outlet valve 17 is switched over to the left position in FIG. 1 to isolate the oil passage 16 from the oil tank T.

In the normal state, the inlet valve 13 is kept switched to the left position in FIG. 1, and in this state, the control hydraulic pressure chambers 10 and 11 are connected to the oil passage 16 through oil passages 14 and 15 but are isolated from the hydraulic pressure pump P and the high hydraulic pressure source of the pressure accumulator A. When a signal is fed to the electromagnetic coil 18 and the coil 18 is actuated, the inlet valve 13 is switched to the right position in FIG. 1, and the control hydraulic pressure chambers 10 and 11 are connected to the hydraulic pressure pump P and pressure accumulator A but are isolated from the oil passage 16.

The first operation state of FIG. 1 where the inlet valve 13 is switched to the left position and the outlet valve 17 is switched to the right position, namely the state where no signal is fed to the electromagnetic coil 18 and 19, will now be described. In this state, since the control hydraulic pressure chambers 10 and 11 are opened to the oil tank T through the oil passages 14 and 15, inlet valve 13, oil passage 16 and outlet valve 17, the respective pistons 5 and 6 are pressed and moved only in accordance with the braking hydraulic pressure in the braking hydraulic pressure chamber 7. Accordingly, in this state, the braking torque at the time of braking is freely increased according to the braking operation of the driver.

In the second operation state, the outlet valve 17 is switched to the left position, namely the state where a signal is fed to the electromagnetic coil 19, the respective control hydraulic pressure oil chambers 10 and 11 are isolated from the oil tank T and the control oil in the chambers 10 and 11 is locked. Accordingly, even if the braking hydraulic pressure is increased, the movement of the pistons 5 and 6 is blocked. Accordingly, the braking torque at the time of braking is kept at a certain level irrespective of the braking operation of the driver.

In the third operation state, the inlet valve 13 is switched to the right position and the outlet valve 17 is switched to the left position, namely the state where signals are fed to both electromagnetic coils 18 and 19, the control hydraulic pressure chambers 10 and 11 are connected to the hydraulic pressure pump P and the high hydraulic pressure source of the pressure accumulator A but are isolated from the oil tank T, and therefore, the control oil is supplied under pressure into the control hydraulic pressure chambers 10 and 11 through the inlet valve 13 from the hydraulic pressure pump P and pressure accumulator A and the pistons 5 and 6 are pressed and moved against the braking hydraulic pressure in the braking hydraulic pressure chamber 7 in such a direction that they are brought closer to each other. Accordingly, the braking torque at the time of braking is reduced irrespective of the braking operation of the driver.

In the fourth operation state, the inlet valve 13 is switched to the right position and also the outlet valve 17 is switched to the right position, namely the state where a signal is fed to the electromagnetic coil 18, the respective control hydraulic pressure chambers 10 and 11 are connected to the high hydraulic pressure source through the inlet valve 13 but are isolated from the oil tank T. Accordingly, the braking torque at the time of braking is reduced irrespective of the braking operation of the driver as in the third operation state.

Figure 2:
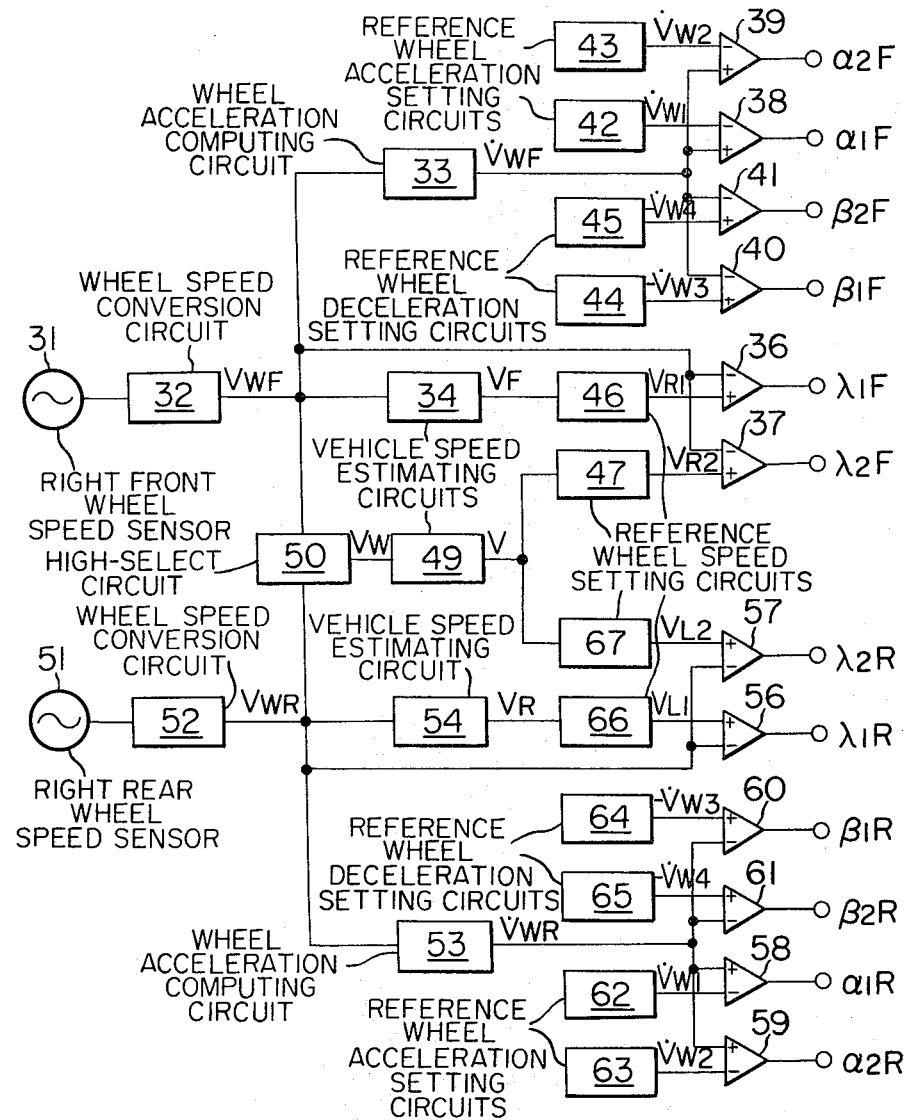
FIG. 2 is a circuit diagram of a control signal producing circuit for producing control signals for controlling the anti-skid brake device shown in FIG. 1 according to a first aspect of the present invention.

FIG. 2 illustrates a first embodiment of the control signal producing circuit for producing control signals for controlling the electromagnetic coils 18 and 19. The structure and operation of this control signal producing a circuit will now be described with reference to FIG. 2.

A frequency signal detected by a wheel speed sensor 31 for the right front wheel is converted to a wheel speed signal VwF by a wheel speed conversion circuit 32. This signal VwF is fed to a wheel acceleration computing circuit 33, a vehicle speed estimating circuit 34 and a high-select circuit 50 and is supplied to speed comparing circuits 36 and 37. In the wheel acceleration computing circuit 33, the front wheel speed signal VwF is differentiated to obtain a front wheel acceleration signal V̇wF indicating the peripheral acceleration of the front wheel. This signal V̇wF is introduced into acceleration comparing circuits 38 and 39 and deceleration comparing circuits 40 and 41. A first reference wheel acceleration signal Vw1 predetermined by a first reference wheel acceleration setting circuit 42 is applied to the acceleration comparing circuit 38, and when the level of the front wheel acceleration signal V̇wF is higher than the level of the first reference wheel acceleration signal Vw1, the circuit 38 produces an output signal α1F. A second reference wheel acceleration signal Vw2 preset at a level higher than the level of the first reference acceleration signal Vw1 by a second reference wheel acceleration setting circuit 43 is applied to the acceleration comparing circuit 39, and when the level of the front wheel acceleration signal V̇wF is higher than the level of the second reference wheel acceleration signal Vw2, the circuit 39 produces an output signal α2F. A first reference wheel deceleration signal −Vw3 indicating a negative wheel acceleration, which is preset by a first reference wheel deceleration setting circuit 44, is applied to the deceleration comparing circuit 40, and when the level of the front wheel acceleration signal V̇wF is lower than the level of the deceleration signal −Vw3, the circuit 40 produces an output signal β1F. A second reference wheel deceleration signal −Vw4 preset by a second reference wheel deceleration setting circuit 45 at a negative level, the absolute value of which is larger than that of the first reference deceleration signal −Vw3, is applied to the deceleration comparing circuit 14, and when the level of the front wheel acceleration signal VwF is lower than the level of the deceleration signal −Vw4, the circuit 41 produces an output signal β2F. As in the conventional technique, the vehicle speed estimating circuit 34 produces an estimated vehicle speed signal VF from the front wheel speed signal VwF and transmits this signal VF to a first reference wheel speed setting circuit 46. This circuit 46 uses the estimated vehicle speed signal VF for producing a first reference wheel speed signal VR1 set at a level lower by a certain proportion than the level of the estimated vehicle speed signal VF and transmits this signal VR1 to the speed comparing circuit 36. The speed comparing circuit 36 produces output signal λ1F when the level of the front wheel signal VwF is lower than the level of the first reference wheel speed signal VR1.

A frequency signal detected by a wheel speed sensor 51 for the right rear wheel is converted to a rear wheel speed signal VwR indicating the peripheral speed of the rear wheel by a wheel speed conversion circuit 52. This rear wheel speed signal VwR is fed to a wheel acceleration computing circuit 53, a vehicle speed estimating circuit 54 and the high-select circuit 50 and is supplied to speed comparing circuits 56 and 57. The wheel acceleration computing circuit 53 differentiates the rear wheel speed signal VwR to produce a rear wheel acceleration signal VwR indicating the peripheral acceleration of the rear wheel. This acceleration signal VwR is supplied to acceleration comparing circuits 58 and 59 and deceleration comparing circuits 60 and 61. A first reference wheel acceleration circuit Vw1 preset by a first reference wheel acceleration setting circuit 62 is applied to the acceleration comparing circuit 58, and the circuit 58 produces an output signal α1R when the level of the rear wheel acceleration signal VwR is higher than the level of the first reference wheel acceleration signal Vw1. A second reference wheel acceleration signal Vw2 preset at a level higher than the level of the first reference acceleration signal Vw1 by a second reference wheel acceleration setting circuit 63 is applied to the acceleration comparing circuit 59, and the circuit 59 produces an output signal α2R when the level of the rear wheel acceleration signal VwR is higher than the level of the second reference wheel acceleration signal Vw2. A first reference wheel deceleration signal −Vw3 indicating the negative wheel acceleration, which is preset by a first reference wheel deceleration setting circuit 64, is applied to the deceleration comparing circuit 60, and the circuit 60 produces an output signal β1R when the level of the rear wheel acceleration signal VwR is lower than the level of the deceleration signal −Vw3. A second reference wheel deceleration signal −Vw4 preset by a second reference wheel deceleration setting circuit 65 at a negative level, the absolute value of which is larger than that of the first reference wheel deceleration signal −Vw3, is applied to the deceleration comparing circuit 61, and the circuit 61 produces an output signal β2R when the level of the rear wheel acceleration signal VwR is lower than the level of the deceleration signal −Vw4. As in the conventional technique, the vehicle speed estimating circuit 54 produces an estimated vehicle speed signal VR from the rear wheel speed signal VwR and transmits this signal VR to a first wheel speed setting circuit 66. This setting circuit 66 uses the estimated vehicle speed signal VR for producing a first reference wheel speed signal VR1 set at a level lower by a certain proportion than the level of the estimated vehicle speed signal VR and transmits this signal VR1 to the speed comparing circuit 56. The speed comparing circuit 56 produces an output signal λ1R when the level of the rear wheel speed signal VwR is lower than the level of the first reference wheel speed signal VR1.

The high-select circuit 50 receives the front wheel speed signal VwF and the rear wheel speed signal VwR, and the circuit 50 selects the signal of a higher level and transmits it as a wheel speed signal Vw to the vehicle speed estimating circuit 49. The vehicle speed estimating circuit 49 produces an estimated vehicle speed signal V based on this signal Vw and transmits this estimated vehicle speed signal V to the second reference wheel speed setting circuit 47 on the front wheel side and the second reference wheel speed setting circuit 67 on the rear wheel side. Each of the setting circuits 47 and 67 produces a second reference wheel speed signal VR2 set at such a low level that the ratio to the level of the estimated vehicle speed signal V is less than 30% (the slip rate is higher than 70%), and this signal VR2 is transmitted to the speed comparing circuits 37 and 57. The speed comparing circuit 37 produces an output signal λ2F when the level of the front wheel speed signal VwF is lower than the level of the second reference wheel speed signal VR2, and the speed comparing circuit 57 produces an output signal λ2R when the level of the rear wheel speed signal VwR is lower than the level of the second reference wheel speed signal VR2.

In the foregoing first embodiment, the wheel speeds are detected from the front and rear wheels on the right side. The wheel speeds, however, may be detected from the front and rear wheels on the left side.

Figure 3:
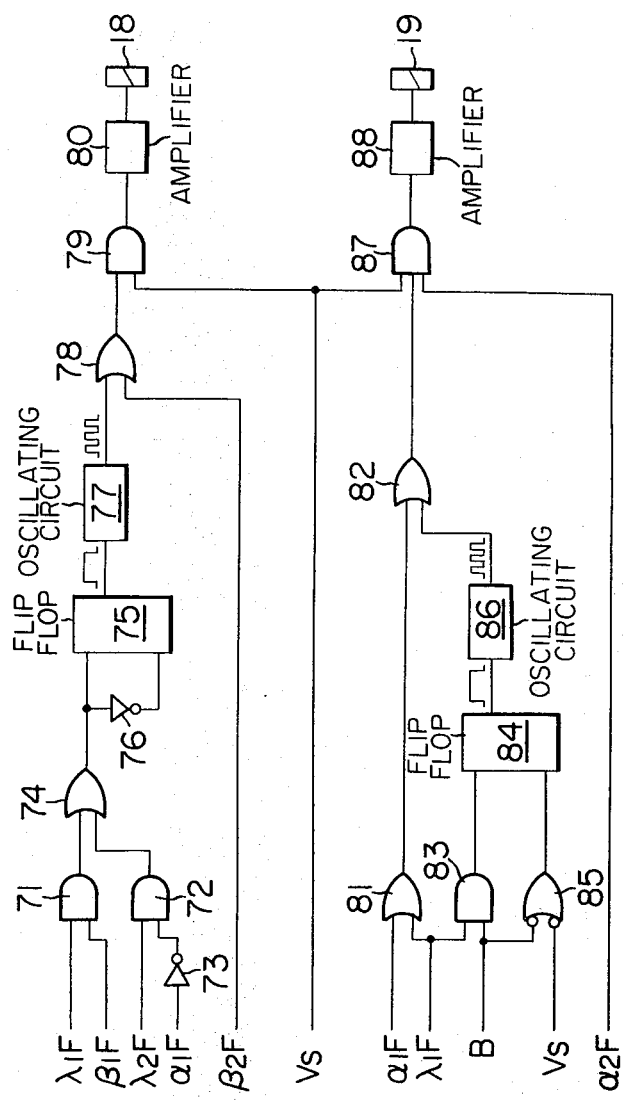
FIG. 3 is a circuit diagram of a control circuit for controlling the anti-skid brake device shown in FIG. 1 according to control signals produced by the control signal producing circuit shown in FIG. 2.

The so-obtained output signals are used as input signals for control circuits for controlling the operations of the electromagnetic coils of anti-skid brake devices for the respective wheels. These control circuits have the same structure. Accordingly, the control circuit for one wheel is illustrated in FIG. 3. Assuming that this control circuit is for one front wheel, the structure and operation will now be described with reference to FIG. 3.

An output signal λ1F produced from the control signal producing circuit is first fed to an AND circuit 71. Also an output signal β1F is fed to this AND circuit 71. When both the signals μ1F and β1F are simultaneously applied, the AND circuit 71 produces an output signal. The output signal λ2F is fed to an AND circuit 72, and also an output signal α1F which has been inverted by an inverter 73 is applied to the AND circuit 72. Accordingly, when the signal λ2F is supplied and the signal α1F is not supplied, the AND circuit 72 produces an output signal. The output signals of the AND circuits 71 and 72 are fed to an OR circuit 74, and when at least one of the AND circuits 71 and 72 produces an output signal, the OR circuit 74 produces an output signal. The output signal of the OR circuit 74 is fed to the set terminal of a flip-flop circuit 75 and also to the reset terminal of the circuit 75 through an inverter 76. When the output signal of the OR circuit 74 is fed to the set terminal of the flip-flop circuit 75, the flip-flop circuit 75 feeds an output signal from the output terminal thereof to an oscillating circuit 77. When the oscillating circuit 77 receives this signal, it produces a pulse signal and feeds it to an OR circuit 78. Also an output signal $\beta 2F$ is fed to this OR circuit 78, and when at least one of the output pulse signal of the oscillating circuit 77 and the signal $\beta 2F$ is fed to the OR circuit 78, the OR circuit 78 produces an output signal and feeds it to an AND circuit 79. When the level of the estimated vehicle signal V from the control signal producing circuit shown in FIG. 2 exceeds a certain value (for example, 7 to 10 Km/hr), a reference low speed signal VS is produced from a circuit (not shown), and this reference speed signal VS is fed to the AND circuit 79. When the AND circuit 79 receives both the output signal of the OR circuit 78 and the reference low speed signal VS simultaneously, the AND circuit 79 produces an output signal which is amplified by an amplifier 80 and the amplified signal excites the electromagnetic coil 18.

The output signals $\alpha 1F$ and $\lambda 1F$ from the control signal producing circuit are further fed to an OR circuit 81. Also the signal $\beta 1F$ may be fed to this OR circui 81. However, on a road having a steep convexities and concavities, uneven rotations are always caused and the signal $\beta 1F$ is constantly produced. Accordingly, the OR circuit 81 produces an output signal substantially constantly, resulting in reduction of the braking efficiency. Therefore, in the present embodiment, the signal $\beta 1F$ is excluded from the input signals. When at least one of the signals $\alpha 1F$ and $\lambda 1F$ is produced, the OR circuit 81 produces an output signal and feeds it to an OR circuit 82. The output signal $\lambda 1F$ from the control signal producing circuit and a braking signal B produced when the braking device is operated are fed to an AND circuit 83, and when the AND circuit 83 simultaneously receives the signals $\lambda 1F$ and B, the AND circuit 83 produces an output signal. The signal $\beta 1F$ may be used instead of the signal $\lambda 1F$ as the input signal for the AND circuit 83. However, in this case, the outlet valve is often actuated by the signal $\beta 1F$ produced due to uneven rotations of the wheel at the time of braking on a road having convexities and concavities. Accordingly, it has been found that use of the signal $\lambda 1F$ is preferred. The output signal of the AND circuit 83 is fed to the set terminal of a flip-flop circuit 84. Furthermore, the braking signal B and reference low speed signal VS are fed to an OR circuit 85 provided with an inverter. When the signal B or VS is produced, the inverter-provided OR circuit 85 produces an output signal at the reset terminal of the flip-flop circuit 84. When the output signal of the AND circuit 83 is fed to the set terminal of the flip-flop circuit 84, the flip-flop circuit 84 feeds a signal to an oscillating circuit 86 from the output terminal of the flip-flop circuit 84. When the oscillating circuit 86 receives the input signal, it produces a pulse signal and feeds it to the OR circuit 82. When the OR circuit 82 receives at least one of the output pulse signal from the oscillating circuit 86 and the output signal from the OR circuit 81, the OR circuit 82 produces an output signal. The output signal of the OR circuit 82, together with the reference low speed signal VS and output signal $\alpha 2F$, is supplied to an AND circuit 87, and when all of these signals are simultaneously produced, and AND circuit 87 produces an output signal. The output signal of the AND circuit 87 is amplified by an amplifier 88 and the amplified signal excites the electromagnetic coil 19.

The operation of controlling the electromagnetic coils 18 and 19 by the above-mentioned front wheel control circuit will now be described. When the level of the front wheel speed signal VwF is lower than the relatively low level of the first reference wheel speed signal VR1 and simultaneously, the level of the front wheel acceleration signal VwF is lower than the level of the first reference wheel deceleration signal $-Vw3$, or when the level of the front wheel speed signal VwF is lower than the level of the second reference wheel speed signal VR2 and simultaneously, the level of the front wheel acceleration signal VwF is lower than the level of the first reference wheel acceleration signal Vw1, the OR circuit 74 produces an output signal to actuate the flip-flop circuit 75 and a pulse signal is produced from the oscillating circuit 77. Accordingly, the OR circuit 78 produces an output signal which is fed intermittently at a high frequency, and when the vehicle speed is higher than a certain level, the electromagnetic coil 18 is turned on and off intermittently at a high frequency. Accordingly, the inlet valve 13 is switched over to the left and right positions in FIG. 1 intermittently, whereby high pressure control oil is supplied intermittently at a high frequency to the control hydraulic pressure chambers 10 and 11 from the hydraulic pressure pump P and the pressure accumulator A and the braking torque is gradually reduced. When the frictional resistance of the road is abruptly reduced during braking and the level of the front wheel acceleration signal VwF becomes lower than the level of the second reference wheel deceleration signal $-Vw4$, the output signal $\beta 2F$ is applied to the OR circuit 78 to actuate the OR circuit 78, and the electromagnetic coil 18 stops the intermittent on-off operation and is kept in the "on" state, with the result that the braking torque is abruptly reduced. When the vehicle speed is at such a low level that the anti-skid brake control is unnecessary, the reference low speed signal VS is not produced and the AND circuit 79 is not actuated, and the inlet valve 13 is held at the left position in FIG. 1.

When the level of the front wheel acceleration signal VwF is higher than the level of the first reference wheel acceleration signal Vw1 and/or the level of the front wheel speed signal VwF is lower than the level of the first reference wheel speed signal VR1 and simultaneously when the level of the front wheel acceleration signal VwF is higher than the level of the second reference wheel acceleration signal Vw2 and the vehicle speed is hgher than the certain level, the AND circuit 87 is actuated to excite the electromagnetic coil 19. Accordingly, the outlet valve 17 is switched over to the left position in FIG. 1 and the oil passage 16 is isolated from the oil tank T. Furthermore, when the level of the front wheel speed signal VwF becomes lower than the level of the first reference wheel speed signal VR1 at the time of braking, the AND circuit 83 produces an output signal to actuate the flip-flop circuit 84, and a pulse signal is produced from the oscillating circuit 86. Accordingly, the OR circuit 82 produces an output signal which is fed intermittently at a high frequency, and when the level of the front wheel acceleration signal VwF is higher than the level of the second reference wheel acceleration signal Vw2 and the vehicle speed is higher than a certain level, the electromagnetic coil 19 performs an intermittent on-off operation at a high frequency, with the result that the output valve 17 is intermittently switched over to the left and right positions in FIG. 1 at a high frequency and the control oil in the control hydraulic pressure chambers 10 and 11 is intermittently discharged to gradually increase the braking torque.

Only the front wheels have been described in the foregoing illustration made with reference to FIG. 3. In connection with the rear wheels, however, the operations are quite the same as those described above.

As will be apparent from the foregoing description, signals other than the signals $\lambda 2F$ and $\lambda 2R$ are produced independently for the respective wheels, and customary anti-skid brake control is performed by signals other than the signals $\lambda 2F$ and $\lambda 2R$. When a braking torque on a border line between the braking torque causing locking and the braking torque not causing locking is applied at the time of braking on a slippery road, since precise estimation of the vehicle speed cannot be made by the vehicle speed estimating circuits 34 and 54, the output signals $\lambda 1F$ and $\lambda 1R$ are not produced from the comparing circuits 36 and 56. However, since the vehicle speed is estimated in the vehicle speed estimating circuit 49 by using the vehicle speed signal Vw obtained by high level selection from the front wheel speed signal VwF and the rear wheel speed signal VwR, the estimation precision is high and output signals $\lambda 2F$ and $\lambda 2R$ are produced from the comparing circuits 37 and 57. Accordingly, an output signal is produced from the AND circuit 72 which receives the signal $\lambda 2F$ and the inverted signal of the signal $\alpha 1F$ in FIG. 3, and the electromagnetic coil 18 is excited to actuate the inlet valve 13. Accordingly, the braking torque is reduced and the wheels are prevented from being locked.

Since the signals $\lambda 2F$ and $\lambda 2R$ are used only when a braking torque on a border line between the braking torque causing locking and the braking torque not causing locking is applied, even if the second reference vehicle speed signal VR2 is set while maintaining a sufficiently high slip rate, the customary anti-skid braking function is not influenced at all. Therefore, an unnecessary anti-skid braking operation can be prevented at the time of sharp turning.

As will be apparent from the foregoing description, in the first embodiment of the present invention, anti-skid brake devices for front and rear wheels are independently controlled by independent signals, and the signals $\lambda 2F$ and $\lambda 2R$ for reducing the braking torques are obtained by using the vehicle speed signal V estimated by higher level selection from the front wheel speed signal VwF and rear wheel speed signal VwR. Accordingly, gradual locking of wheels can be prevented at the time of braking on a slippery road, and furthermore, an unnecessary anti-skid braking operation can be prevented at the time of sharp turning or the like. Thus, the anti-skid brake control can always be performed assuredly. Therefore, a very excellent anti-skid brake control method for a vehicle, which exerts very excellent braking effects, can be provided according to the first embodiment of the present invention.

Figure 4:
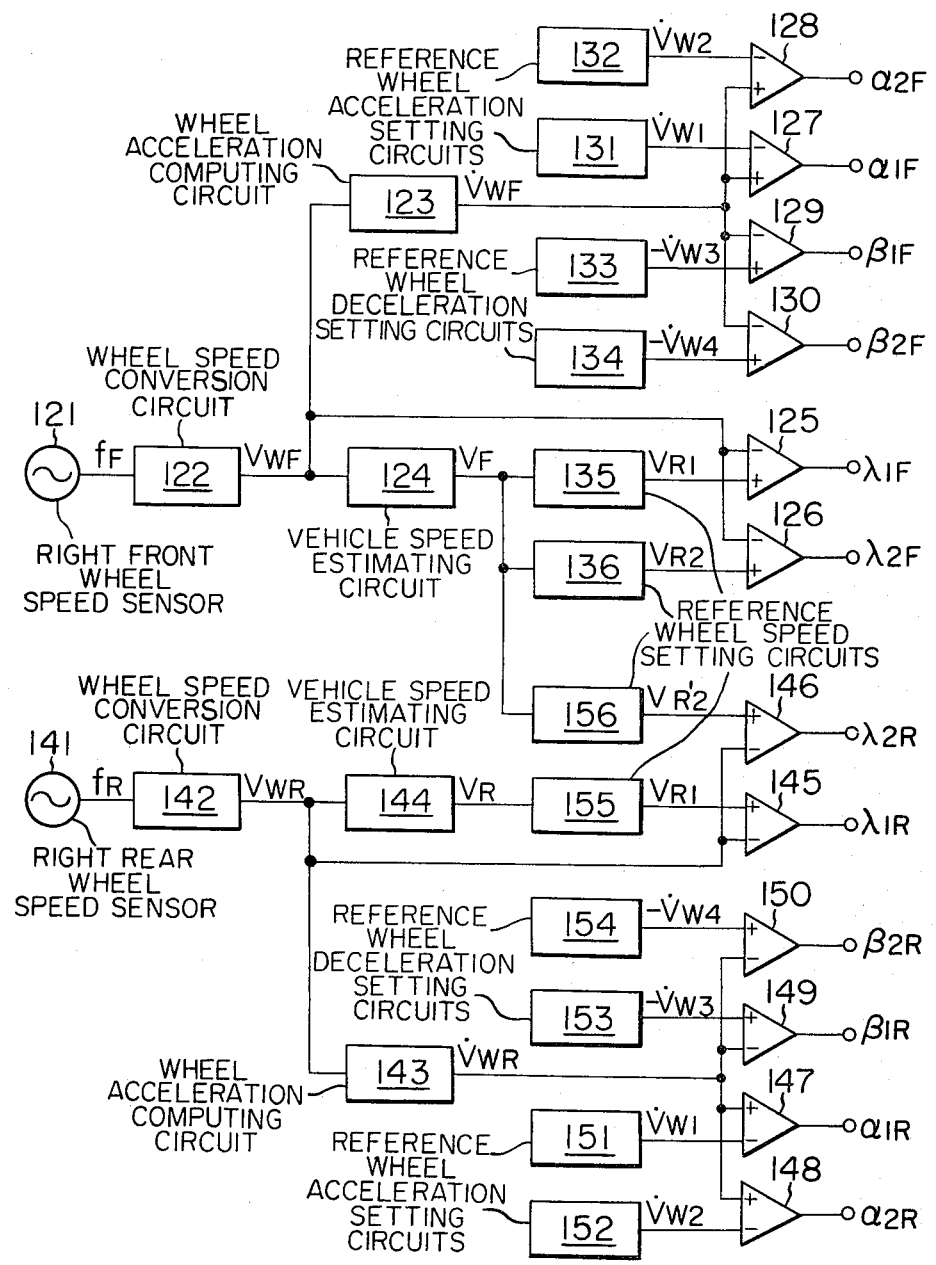
FIG. 4 is a circuit diagram of a control signal producing circuit for producing control signals according to a second aspect of the present invention.

FIG. 4 illustrates a second embodiment of the control signal producing circuit for producing control signals for controlling the operations of the electromagnetic coils 18 and 19. The structure and operation of this control signal producing circuit will now be described with reference to FIG. 4.

A wheel speed sensor 121 for the right front wheel produces as an output signal a frequency signal proportional to the peripheral speed of the right front wheel, and this signal is converted to a front wheel speed signal VwF indicating the peripheral speed of the right front wheel by a wheel speed converting circuit 122. This front wheel speed signal VwF is fed to a wheel acceleration computing circuit 123 and a vehicle speed estimating circuit 124 and is transmitted to speed comparing circuits 125 and 126. In the wheel acceleration computing circuit 123, the front wheel speed signal VwF is differentiated to produce a front wheel acceleration signal VwF indicating the peripheral acceleration of the right front wheel. This acceleration signal VwF is supplied to acceleration comparing circuits 127 and 128 and deceleration comparing circuits 129 and 130. A first reference wheel acceleration signal Vw1 preset by a first reference wheel acceleration setting circuit 131 is fed to the acceleration comparing circuit 127, and the circuit 127 produces an output signal $\alpha 1F$ when the level of the front wheel acceleration signal VwF is higher than the level of the first reference wheel acceleration signal Vw1. A second reference wheel acceleration signal Vw2 preset at a level higher than the level of the first reference wheel acceleration signal Vw1 by a second reference wheel acceleration setting circuit 132 is applied to the acceleration comparing circuit 128, and the circuit 128 produces an output signal $\alpha 2F$ when the level of the front wheel acceleration signal VwF is higher than the level of the second reference wheel acceleration signal Vw2. A first reference wheel deceleration wheel $-Vw3$ indicating a negative wheel acceleration preset by a first reference wheel deceleration setting circuit 133 is fed to the deceleration comparing circuit 129, and the circuit 129 produces an output signal $\beta 1F$ when the level of the front wheel acceleration signal VwF is lower than the level of the deceleration signal $-Vw3$. A second reference wheel deceleration signal $-Vw4$ preset at a negative level, the absolute value of which is larger than that of the first reference wheel deceleration signal $-Vw3$, by a second reference wheel deceleration setting circuit 134 is fed to the deceleration comparing circuit 130, and the circuit 130 produces an output signal $\beta 2F$ when the level of the front wheel acceleration signal VwF is lower than the level of the deceleration signal $-Vw4$. As in the conventional technique, the vehicle speed estimating circuit 124 produces an estimated vehicle speed signal VF from the front wheel speed signal VwF and transmits this signal VF to a first reference wheel speed setting circuit 135. This circuit 135 sets a first reference wheel speed signal VR1 according to a slip rate $\lambda o$ preset for the estimated vehicle speed signal VF as follows:

$$VR1 = (1 - \lambda o)\ VF$$

Since the slip rate $\lambda o$ is a positive value, the level of this first reference wheel speed signal VR1 is lower than the level of the estimated vehicle speed signal VF. The first reference wheel speed signal VR1 is transmitted to the speed comparing circuit 125, and the circuit 125 produces an output signal $\lambda 1F$ when the level of the front wheel speed signal VwF is lower than the level of this signal VR1.

The output signal from the vehicle speed estimating circuit 124, namely the estimated vehicle speed signal VF, is also fed to a second reference wheel speed setting circuit 136, and this circuit 136 sets a second reference wheel speed signal VR2 in which the slip rate is much higher than the slip rate set for the estimated vehicle speed signal VF, for example, 70% or higher. Accordingly, the level of the second reference wheel speed signal VR2 is lower than the level of the first reference wheel speed signal VR1. This signal VR2 is transmitted to the speed comparing circuit 126, and when the level of this signal VR2 is higher than the level of the front wheel speed signal VwF, the circuit 126 produces an output signal $\lambda 2F$.

A frequency signal produced from a wheel speed sensor 141 for the right rear wheel is converted to a rear wheel speed signal VwR indicating the peripheral speed of the rear wheel by a wheel speed converting circuit 142. This rear wheel speed signal VwR is fed to a wheel acceleration computing circuit 143 and a vehicle speed estimating circuit 144 and is transmitted to speed comparing circuits 145 and 146. The wheel acceleration computing circuit 143 differentiates the rear wheel speed signal VwR to produce a rear wheel acceleration signal VwR indicating the peripheral acceleration of the rear wheel. This acceleration signal VwR is supplied to acceleration comparing circuits 147 and 148 and deceleration comparing circuits 149 and 150. A first reference wheel acceleration signal Vw1 preset by a first reference wheel acceleration setting circuit 151 is fed to the acceleration comparing circuit 147, and the circuit 147 produces an output signal $\alpha 1R$ when the level of the rear wheel acceleration signal VwR is higher than the level of the first reference wheel acceleration signal Vw1. A second reference wheel acceleration signal Vw2 set at a level higher than the level of the first reference wheel acceleration signal Vw1 by a second reference wheel acceleration setting circuit 152 is fed to the acceleration comparing circuit 148, and when the level of the rear wheel acceleration signal VwR is higher than the level of the second reference wheel acceleration signal Vw2, the circuit 148 produces an output signal $\alpha 2R$. A first reference wheel deceleration signal $-Vw3$ indicating a negative wheel acceleration preset by a first reference wheel deceleration setting circuit 153 is fed to the deceleration comparing circuit 149, and when the level of the rear wheel acceleration signal VwR is lower than the level of this deceleration signal $-Vw3$, the circuit 149 produces an output signal $\beta 1B$. A second reference wheel deceleration signal $-Vw4$ set at a negative level, the absolute value of which is larger than that of the first reference wheel deceleration signal $-Vw3$, by a second reference wheel deceleration setting circuit 154, is fed to the deceleration comparing circuit 150, and when the level of the rear wheel acceleration signal VwR is lower than the level of this signal $-Vw4$, the circuit 150 produces an output signal $\beta 2R$. As in the conventional technique, the vehicle speed estimating circuit 144 produces an estimated vehicle speed signal VR from the rear wheel speed signal VwR and transmits this signal VR to a first reference wheel speed setting circuit 155. This circuit 155 sets a first reference wheel speed signal VR1 having a slip rate preset for the estimated vehicle acceleration signal VR, and transmits this signal VR1 to the speed comparing circuit 145. The speed comparing circuit 145 produces an output signal $\lambda 1R$ when the level of the rear wheel speed signal VwR is lower than the level of the first reference wheel speed signal VR1.

The output signal from the vehicle speed estimating circuit 124 of the front wheel, that is, the estimated vehicle speed signal VF, is fed to a second reference wheel speed setting circuit 156, and a second reference wheel speed signal VR′2 is set based on this input signal VR. This signal VR′2 is transmitted to the speed comparing circuit 146 and when the level of the rear wheel speed signal VwR is lower than the level of this signal VR′2, the circuit 146 produces an output signal $\lambda 2R$.

Figure 5:
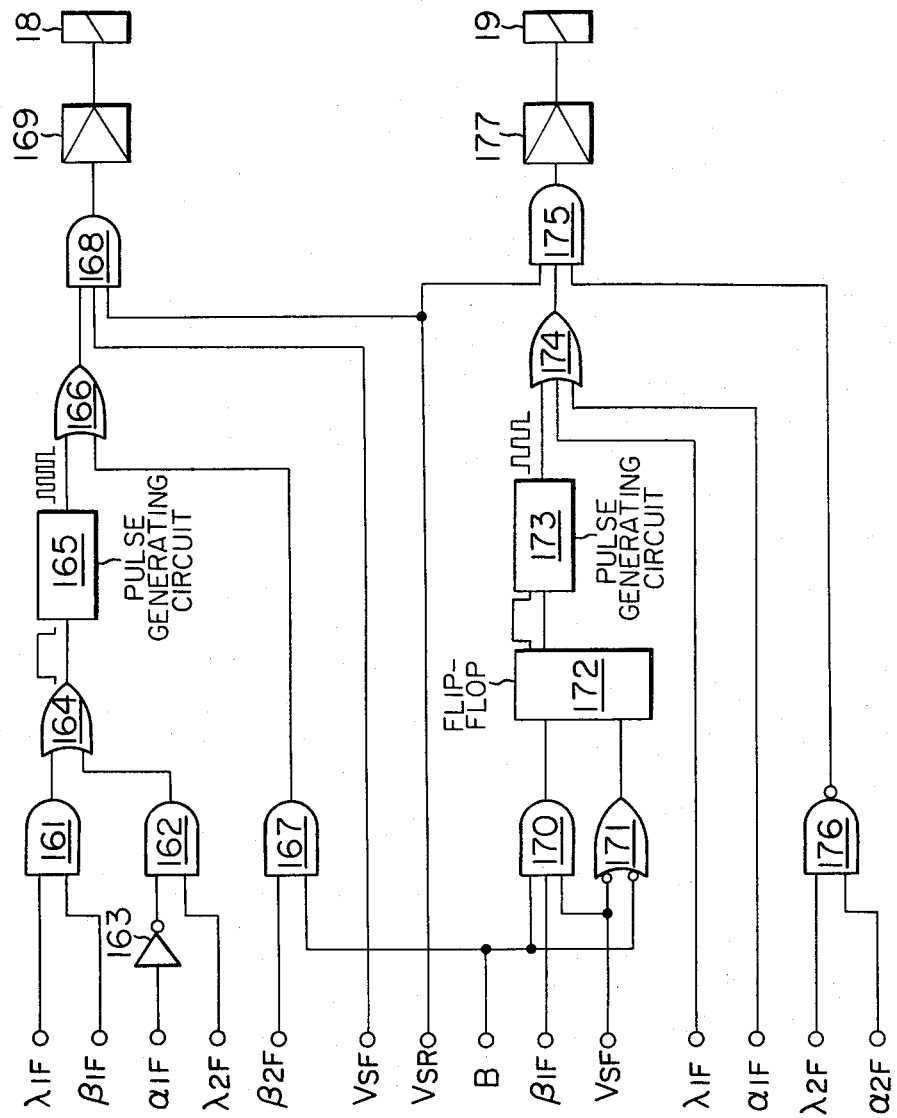
FIG. 5 is a circuit diagram of a control circuit for controlling an anti-skid brake device of front wheels according to control signals produced by the control signal producing circuit shown in FIG. 4.

The thus obtained output signals are used as input signals for the control circuits for controlling the operations of the electromagnetic coils of the anti-skid brake devices for the right front and rear wheels. FIGS. 5 and 6 illustrate the control circuit for the front wheel and the control circuit for the rear wheel, respectively.

The structure and operation of the control circuit for the front wheel will now be described with reference to FIG. 5. The output signal $\lambda 1F$ produced from the control signal producing circuit shown in FIG. 4 is first fed to an AND circuit 161 to which the output signal $\beta 1F$ is also fed. When both the signals $\lambda 1F$ and $\beta 1F$ are simultaneously fed to the AND circuit 161, and output signal is produced by the AND circuit 161. The output signal $\lambda 2F$ is fed to an AND circuit 162, and the output signal $\alpha 1F$ which has been inverted by an inverter 163 is fed to the AND circuit 162. Accordingly, the AND circuit 162 produces an output signal when the signal $\lambda 2F$ is produced and the signal $\alpha 1F$ is not produced. The output signals from the AND circuits 161 and 162 are fed to an OR circuit 164, and when at least one of the AND circuits 161 and 162 produces an output signal, the OR circuit 164 produces an output signal. The output signal of the OR circuit 164 is transmitted to a pulse generating circuit 165. A pulse signal is produced from the circuit 165 and is transmitted to an OR circuit 166.

When the estimated vehicle speed signals VF and VR from the control signal producing circuit shown in FIG. 4 are at levels higher than a certain value (for example, 7 to 10 km/hr), reference low speed signals VSF and VSR are produced from a circuit (not shown), and when the brake device is being operated, a braking signal B is produced. When both the output signal $\beta 2F$ from the control signal producing circuit and the braking signal B are simultaneously produced, an AND circuit 167 produces an output signal and transmits this signal to the OR circuit 166. When the OR circuit 166 receives at least one of the pulse signals of the pulse generating circuit 165 and the output signal of the AND circuit 167, the OR circuit 166 produces an output signal and transmits it to an AND circuit 168. When the output signal of the OR circuit 166 and the reference low speed signals VSF and VSR are simultaneously produced, the AND circuit 168 produces an output signal, and this output signal is amplified by an amplifier 169 and excites the electromagnetic coil 18.

The output signal $\beta 1F$ from the control signal producing circuit shown in FIG. 4 is also fed to another AND circuit 170. When this output signal $\beta 1F$, the braking signal B and the reference low speed signal VSF are simultaneously supplied to the AND circuit 170, the circuit 170 produces an output signal. The braking signal B and reference low speed signal VSF are also fed to an OR circuit 171 provided with an inverter, and when the signal B or VSF is not produced, the inverter-provided OR circuit 171 produces an output signal. The output signal of the AND circuit 170 is fed to the set terminal of a flip-flop circuit 172, and the output signal of the inverter-provided OR circuit 171 is fed to the reset terminal of the flip-flop circuit 172. Accordingly, the flip-flop circuit 172 is set when the AND circuit 170 produces the output signal, and the flip-flop circuit 172 transmits the output signal to a pulse generating circuit 173. When the inverter-provided OR circuit 171 produces an output signal, the flip-flop circuit 172 is reset. When the flip-flop circuit 172 produces an output signal, the pulse generating circuit 173 produces a pulse signal. This pulse signal is transmitted to an OR circuit 174. When at least one of the pulse signal and the output signals λ1F and α1F from the control signal producing circuit is produced, the OR circuit 174 produces an output signal and feeds it to an AND circuit 175. The output signals λ2F and α2F are fed to a NAND circuit 176, and an output signal is produced from the NAND circuit 176 except when both the signals λ2F and α2F are simultaneously produced. This output signal from the NAND circuit 176 is transmitted to the AND circuit 175. When all of the output signals of the OR circuit 174 and NAND circuit 176 and the reference low speed signal VSR are simultaneously produced, the AND circuit 175 produces an output signal, and this output signal is amplified by an amplifier 177 and excites the electromagnetic coil 19.

The structure and operation of the control circuit for the rear wheel will now be described with reference to FIG. 6. The output signals λ1R and λ2R produced from the control signal producing circuit shown in FIG. 4 are fed to AND circuits 178 and 179, respectively. Also the signal β1R is fed to the AND circuits 178 and 179. When both the signals λ1R and β1R are simultaneously produced, the AND circuit 178 produces an output signal, and when both the signals λ2R and β1R are simultaneously produced, the AND circuit 179 produces an output signal. When at least one of the AND circuits 178 and 179 produces an output signal, an OR circuit 180 produces an output signal. The output signal of the OR circuit 180 is supplied to a pulse generating circuit 181, and the circuit 181 produces a pulse signal. This pulse signal is supplied to an OR circuit 182. When both the output signal β2R from the control signal producing circuit and the braking signal B are simultaneously produced, an AND circuit 183 produces an output signal, and this signal is transmitted to the OR circuit 182. When the OR circuit 182 receives at least one of the pulse signal of the pulse generating circuit 181 and the output signal of the AND circuit 183, the OR circuit 182 produces an output signal and transmits it to an AND circuit 184. When the output signal of the OR circuit 182 and the reference low speed signal VSR are simultaneously produced, the AND circuit 184 produces an output signal, and this output signal is amplified by an amplifier 185 and excites the electromagnetic coil 18.

The output signal λ1R from the control signal producing circuit it also fed to another AND circuit 186. When this output signal λ1R, the braking signal B and the reference low speed signal VSR are simultaneously applied to the AND circuit 186, the circuit 186 produces an output signal. The braking signal B and reference low speed signal VSR are also fed to an OR circuit 187 provided with an inverter. When the signal B or VSR is not produced, the inverter-provided OR circuit 187 produces an output signal. The output signal of the AND circuit 186 is fed to the set terminal of a flip-flop circuit 188, and the output signal of the inverter-provided OR circuit 187 is fed to the reset terminal of the flip-flop circuit 188. Accordingly, when the output signal is produced by the AND circuit 186, the flip-flop circuit 188 is set to transmit the output signal to a pulse generating circuit 189, and when the inverter-provided OR circuit 187 produces the output signal, the flip-flop circuit 188 is reset. When the flip-flop circuit 188 produces the output signal, the pulse generating circuit 189 produces a pulse signal and transmits it to an OR circuit 190. When at least one of this pulse signal and the output signals λ1R and α1R is produced, the OR circuit 190 produces an output signal and feeds it to an AND circuit 191. The signals λ2R and α2R from the control signal producing circuit are fed to a NAND circuit 192, and an output signal is produced from the NAND circuit 192 except when these signals λ2R and α2R are simultaneously produced. The output signal of the NAND circuit 192 is transmitted to the AND circuit 191, and when all of the output signals of the OR circuit 190 and NAND circuit 192 and the reference low speed signal VSR are simultaneously produced, the AND circuit 191 produces an output signal. This output signal is amplified by an amplifier 193 and the amplified signal excites the electromagnetic coil 19.

The reason why the reference low speed signal VSR associated with the rear wheel is employed for control of the front wheel as shown in FIG. 5 in the above-mentioned second embodiment is that the anti-skid brake device is prevented from being actuated when skid is produced by abrupt acceleration. In the foregoing description, the control circuits for the anti-skid brake devices of the right front and rear wheels have been described. Of course, similar control circuits may be used for the left front and rear wheels.

The operation of actuating the electromagnetic coils 18 and 19 by the respective wheel control circuits will now be described. The control circuit for the front wheel is first described.

When the level of the front wheel speed signal VwF is lower than the level of the first reference wheel speed signal VR1 and simultaneously, the level of the front wheel acceleration signal VwF is lower than the level of the first reference wheel deceleration signal −Vw3, or when the level of the front wheel speed signal VwF is lower than the level of the second reference wheel speed signal VR2 and simultaneously, the level of the front wheel acceleration signal VwF is lower than the level of the first reference wheel acceleration signal Vw1, the OR circuit 164 produces an output signal and the pulse generating circuit 165 produces a pulse. Accordingly, the OR circuit 166 produces an output signal which is intermittently on and off at a high frequency, and when the level of the estimated vehicle speed signal VF is higher than each of the levels of the reference low speed signals VSF and VSR, the electromagnetic coil 18 is intermittenly turned on and off at a high frequency, with the result that the inlet valve 13 is intermittently switched over to the right and left positions in FIG. 1, and the high pressure control oil is intermittently supplied bit by bit to the control hydraulic pressure chambers 10 and 11 from the hydraulic pressure pump P and the pressure accumulator A and the braking torque is gradually reduced. When the friction resistance of the road surface is abruptly reduced during braking and the level of the front wheel acceleration signal VwF becomes lower than the level of the second reference deceleration signal −Vw4, an output signal is produced by the AND circuit 167 and is fed to the OR circuit 166. Accordingly, the output signal of the OR circuit 166 is converted to a continuous signal, and the intermittent on-off operation of the electromagnetic coil 18 is halted and the coil 18 is kept in the "on" state, with the result that the breaking torque is abruptly reduced. When the vehicle speed is at such a low level that the anti-skid brake control is unnecessary, at least one of the reference low speed signals VSF and VSR is not produced and the AND circuit 168 produces no output signal.

Accordingly, the inlet valve 13 is held at the left position in FIG. 1.

When the vehicle speed is higher than a certain level during braking and the level of the front wheel acceleration signal VwF is lower than the level of the first reference wheel deceleration signal $-Vw3$, the AND circuit 170 produces an output signal to actuate the flip-flop circuit 172, and a pulse signal is produced by the pulse generating circuit 173. At this point, if the level of the front wheel speed signal VwF is higher than the level of the second reference wheel speed signal VR2 and/or the level of the front wheel acceleration signal VwF is lower than the level of the second reference acceleration signal Vw2, the AND circuit 175 produces an output signal which is intermittently on and off at a high frequency and the electromagnetic coil 19 is intermittently turned on and off at a high frequency, with the result that the outlet valve 17 is intermittently switched over to the left and right positions in FIG. 1. When the level of the front wheel speed signal VwF is lower than the level of the first reference wheel speed signal VR1 and/or the level of the front wheel acceleration signal VwF is higher than the level of the first reference acceleration signal Vw1, the OR circuit 174 produces a continuous output signal. Accordingly, the electromagnetic coil 19 is kept in the "on" state, and the outlet valve 17 is switched over to the right position in FIG. 1 and held at this position. When the braking operation is not performed or the vehicle speed is at such a low value that the anti-skid brake control is unnecessary, or when the level of the front wheel speed signal VwF is lower than the level of the second reference wheel speed signal VR2 and simultaneously, the level of the front wheel acceleration VwF is higher than the second reference wheel acceleration signal Vw2, since no output signal is produced from the AND circuit 175, the outlet valve 17 is held at the right position in FIG. 1

The operation of actuating the electromagnetic coils 18 and 19 by the control circuit for the rear wheel will now be described.

When the level of the rear wheel speed signal VwR is lower than the level of the first reference wheel speed signal VR1 or the second reference wheel speed signal VR'2 (obtained from the front wheel speed signal VwF) and simultaneously, the level of the rear wheel acceleration signal VwR is lower than the level of the first reference wheel deceleration signal $-Vw3$, the OR circuit 180 produces the output signal, and the pulse generating circuit 181 involves a pulse signal. Accordingly, the OR circuit 182 produces an output signal which is intermittently on and off at a high frequency. When the vehicle speed is higher than a certain level, the electromagnetic coil 18 is intermittently turned on and off at a high frequency by the output from the AND circuit 184, with the result that the inlet valve 13 is intermittently switched over to the right and left positions in FIG. 1 at a high frequency and the braking torque is gradually reduced. When the level of the rear wheel acceleration signal VwR becomes lower than the level of the second reference wheel deceleration signal $-Vw4$, the AND circuit 183 produces the output signal and this signal is applied to the OR circuit 182. Accordingly, the output signal of the OR circuit 182 is converted to a continuous signal and the intermittent on-off operation of the electromagnetic coil 18 is halted and the coil 18 is kept in the "on" state, with the result that the braking torque is abruptly reduced. When the vehicle speed is at such a low level that the anti-skid brake control is unnecessary, the reference low speed signal VSR is not produced and the AND circuit produces no output signal, and thereof, the inlet valve 13 is held at the left position in FIG. 1.

When the vehicle speed is higher than a certain level during braking and the level of the rear wheel speed signal VwR is lower than the level of the first reference wheel speed VR1, an output signal is produced by the AND circuit 186 to actuate the flip-flop circuit 188, and a pulse signal is reduced by the pulse generating circuit 189. At this time, if the level of the rear wheel speed signal VwR is higher than thwe level of the second reference wheel speed signal VR'2 and/or the level of the rear wheel acceleration signal VwR is lower than the lwevel of the second reference wheel acceleration signal Vw2, the AND circuit 191 produces an output signal which is intermittently on and off at a high frequency, and the electromagnetic coil 19 is intermittently turned on and off at a high frequency. When the level of the rear wheel speed signal VwR is lower than the level of the first reference wheel speed signal VR1 and/or the level of the rear wheel acceleration signal VwR is higher than the level of the first reference acceleration signal Vw1, since the OR circuit 190 produces a continuous output signal, the electromagnetic coil 19 is kept in the "on" state, and the outlet valve 17 is switched over the left position in FIG. 1 and held at this position. When the vehicle speed is lower than a certain level or when the level of the rear wheel speed signal VwR is lower than the level of the second reference wheel speed VR'2 and simultaneously, the level of the rear acceleration signal VwR is higher than the level of the second reference wheel acceleration signal Vw2, since no output signal is produced by the AND circuit 191, the outlet valve 17 is held at the right position in FIG. 1.

The operation of the anti-skid brake device when the above-mentioned control circuit is adopted will now be described.

When the braking torque is applied to the wheels in the state where the levels of the estimated vehicle speed signals VF and VR are higher than the levels of the reference low speed signals VSF and VSR, respectively, the braking signal B and reference low signals VSF and VSR are first produced from the control signal producing circuit shown in FIG. 4. Since the speed of the wheels begins to decrease simultaneously with application of the braking torque, the levels of the wheel acceleration signals VwF and VwR are directed to negative values from 0. Accordingly, none of the signals $\alpha 1F$, $\alpha 1R$ and $\alpha 2R$ are produced at this time. Just after initiation of the braking operation, since the levels of the wheel speed signals VwF and VwR are higher than the level of the first reference wheel speed signal VR1 and the levels of the wheel acceleration signals VwF and VwR are higher than the level of the first reference deceleration signal $-Vw3$, none of the signals $\lambda 1F$, $\lambda 2F$, $\lambda 1R$, $\lambda 2R$, $\beta 1F$, $\beta 2F$, $\beta 1R$ and $\beta 2R$ are produced. Accordingly, no signal is applied to the electromagnetic coil 18 or 19, and the anti-skid brake device is in the first operation state and the braking torque is increased according to the braking operation of the driver. When the deceleration of the wheels is increased and the levels of the wheel acceleration signals VwR become lower than the level of the first reference deceleration signal $-Vw3$, the signals $\beta 1F$ and $\beta 1R$ are produced. At this point, the operation of the flip-flop circuit 172 is started in the control circuit for the front wheel and the electromagnetic coil 19 is intermittently turned on and off, with the result that the anti-skid brake device intermittently performs the operation of the first state and the operation of the second state alternately and the braking torque is gradually increased. When the wheels are further decelerated and the levels of the wheel speed signals VwF and VwR become lower than the level of the first reference wheel speed signal VR1, the signals λ1F and λ1R are produced. At this point, in the control circuit for the front wheel, the AND circuit 161 and the OR circuit 174 produce output signals, and an on-off signal is transmitted to the AND circuit 168 while a continuous signal is simultaneously transmitted to the AND circuit 175, with the result that the electromagnetic coil is intermittently turned on and off while the electromagnetic coil 19 is continuously actuated. Accordingly, the anti-skid brake device intermittently performs the operation of the second state and the operation of the third state alternately, and the braking torque is reduced. The levels of the wheel acceleration signals VwF and VwR are increased with reduction of the braking torque and become higher than the level of the first reference wheel deceleration signal $-Vw3$. At this point, the signals $\beta1F$ and $\beta1R$ are not produced any longer and excitation of the electromagnetic coil 18 is stopped. However, the signals λ1F and λ1R are still produced and the electromagnetic coil 19 is kept excited. Accordingly, the anti-skid brake device is in the second operation state and the braking torque is maintained at a constant level. When the acceleration of the wheels is further increased, the levels of the wheel acceleration signals VwF and VwR become higher than the level of the first reference wheel acceleration signal Vw1, and the signals $\alpha1F$ are produced but the anti-skid brake device is still kept in the second operation state. When the levels of the wheel acceleration signals VwF and VwR become higher than the level of the second reference wheel acceleration signal Vw2, the signals $\alpha2F$ and $\alpha2R$ are produced but production of the output signals from the NAND circuits 176 and 192 is stopped, with the result that excitation of the electromagnetic coil 19 is stopped, and the anit-skid brake device is turned into the first operation state and the braking torque is increased.

When the wheels come onto a slippery road having a relatively low friction coefficient from a tractable road having a relatively large friction coefficient during the braking operation, it often happens that the deceleration of the wheels is drastically increased or the speed of the wheels is drastically reduced, and in such case, locking of the wheels is readily caused. In the present embodiment, however, when the levels of the wheel acceleration signals VwF and VwR become lower than the level of the second reference wheel deceleration signal $-Vw4$ having a negative value, the absolute value of which is larger than that of the first reference wheel deceleration signal $-Vw3$, the signals $\beta2F$ and $\beta2R$ are produced, and the AND circuits 167 and 183 produce the output signals and transmit them continuously to the electromagnetic coil 18. Accordingly, the anti-skid brake device is maintained in the third operation state 3 and the braking torque is abruptly reduced, and locking of the wheels is prevented. When the levels of the wheel speed signals VwF and VwR become lower than the relatively low levels of the second reference wheel speed signals VR2 and VR'2, the signals λ2F and λ2R are produced, and with respect to the front wheel, the braking torque is reduced until the level of the front wheel acceleration signal VwF becomes equal to the level of the first reference wheel acceleration signal Vw1, with the result that the acceleration of the wheels is sufficiently restored and locking of the wheels is avoided. With respect to the rear wheel, from the results of experiments, it was found that while the anti-skid brake is being controlled, variations of the rear wheel speed signal VwR are very small and the level of this signal is hardly brought close to 0. Accordingly, application of the braking torque reducing signal need not be continued until the signal $\alpha1R$ is produced, and even if reduction of the braking torque is stopped when production of the signal $\beta1R$ is stopped, sufficient effects can be attained, in practice. For this reason, in the embodiment shown in FIG. 6, an arrangement is made so that in the case where the level of the rear wheel speed signal VwR is lower than the level of the second reference wheel speed signal VR'2, when the level of the rear wheel acceleration signal VwR exceeds the level of the first reference wheel deceleration signal $-Vw3$, transmittance of the signal to the electromagnetic coil 18 is stopped. If this arrangement is adopted, the signal for reducing the braking torque is not produced, unless the level of the rear wheel acceleration signal VwR becomes lower than the level of the first reference wheel deceleration signal $-Vw3$. Accordingly, the second reference wheel speed signal VR2 need not be set at a low level (the slip rate need not be increased), and the unnecessary operation of the anti-skid brake device at the time of sharp turning or the like can be prevented and the capacity of the anti-skid brake device can be increased.

When a braking torque on a border line between the braking torque causing locking of wheels and the braking torque not causing locking of wheels is applied on a slippery road such as a frozen road, it sometimes happens that the rear wheels are gradually locked. In the present embodiment, however, since the second reference wheel speed signal VR'2 for the rear wheel is set by using the estimated vehicle speed signal VF estimated from the speed of the front wheel, the level of the rear wheel speed signal VwR becomes lower than the level of the second reference wheel speed signal VR'2 before locking of the rear wheel, and the signal λ2R is produced and the braking torque is reduced, whereby locking of the rear wheels can be obviated assuredly.

As will be apparent from the foregoing description, according to the second embodiment of the present invention, since the anti-skid brake device for the front and rear wheels are independently controlled by independent control signals and the second reference wheel speed signal VR'2 for the rear wheel is set by using the vehicle speed signal VF estimated from the front wheel speed signal VwF, locking of the wheels at the time of braking on a slippery road is prevented and also unnecessary operation of the anti-skid brake device can be avoided. Therefore, according to the second embodiment of the present invention, there can be provided a method of controlling an anti-skid brake in a vehicle, in which an excellent anti-skid brake controlling effect can be exerted while preventing locking of the wheels, and an excellent braking effect can always be obtained assuredly.

What is claimed is:

1. A method of controlling an anti-skid brake system in a vehicle, which comprises comparing a front wheel speed signal VwF indicating the peripheral speed of the front wheel and a rear wheel speed signal VwR indicating the peripheral speed of a rear wheel at the time of braking the vehicle, with a first reference wheel speed signal VR1, the value of which is lower than the vehicle speed, and a second reference wheel speed signal VR2, said signal VR2 being obtained by relating a vehicle speed signal V corresponding to the larger of signals VwF and VwR and a pre-determined value of wheel slip rate, the value of said second referene wheel speed signal VR2 being lower than the value of said first reference wheel speed signal VR1, comparing a front wheel acceleration signal VwF indicating the peripheral acceleration of the front wheel and a rear wheel acceleration signal VwR indicating the peripheral acceleration of the rear wheel, with a first reference wheel acceleration signal Vw1 representing a certain positive wheel acceleration, a second reference wheel acceleration signal Vw2, the value of which is higher than the value of the first reference wheel acceleration signal and a reference wheel deceleration signal −Vw3 indicating a certain negative wheel acceleration, and reducing the braking torque applied to the front wheel or rear wheel when (1) the value of the front wheel speed signal VwF or the rear wheel speed signal VwR is lower than the value of the first reference wheel speed signal VR1 and is higher than the value of the second reference wheel speed signal VR2 and the value of the front wheel acceleration signal VwF or rear wheel acceleration signal VwR is lower than the value of the reference wheel deceleration signal −Vw3, and (2) when the value of the front wheel speed signal VwF or the rear wheel spedd signal VwR is lower than the value of the second reference wheel speed signal VR2, until the value of the front wheel acceleration signal VwF or rear wheel acceleration signal VwR becomes higher than the value of the first reference wheel acceleration signal Vw1.

2. A method as claimed in claim 1, wherein the reduction of the braking torque for the front and rear wheels is effected intermittently.

3. A method as claimed in claim 2 wherein the front wheel acceleration signal VwF and the rear wheel acceleration signal VwR are compared with a second reference wheel deceleration signal −Vw4 set at a negative value, the absolute value of which is larger than that of said reference wheel deceleration signal −Vw3, and when the value of the front wheel acceleration signal VwF or the rear wheel acceleration signal VwR is lower than said second reference wheel deceleration signal −Vw4, the braking torque for the front or rear wheels is reduced continuously.

4. A method of controlling an anti-skid brake in a vehicle having front and rear wheels and left and right sides, which comprises detecting the peripheral speeds of front and rear wheels at the left or right side of the vehicle and converting said peripheral speeds to a front wheel speed signal VwF and a rear wheel speed signal VwR, determining estimated vehicle speed signals VF and VR and front wheel and rear wheel acceleration signals VwF and VwR from said wheel speed signals VwF and VwR, setting a first reference wheel acceleration signal Vw1 and a first reference deceleration signal −Vw3, obtaining a first reference wheel speed signal VR1 by relating said estimated vehicle speed signals VF and VR respectively with a slip rate, obtaining second reference wheel speed signals VR2 and VR'2 by relating said estimated vehicle speed signal VF with a slip rate higher than the slip rate for the first reference wheel speed signal VR1, comparing said front and rear speed signals VwF and VwR with said first reference wheel speed signals VR1 and said second reference wheel speed signals VR2 and VR'2 respectively at the time of braking of the vehicle, further comparing said front and rear wheel acceleration signals VwF and VwR respectively with said first reference wheel acceleration signal Vw1 and said first reference wheel deceleration signal −Vw3, and controlling a brake device to reduce the braking torque on the front and rear wheel when (1) the level of said wheel speed signal VwF or VwR is lower than the level of said first reference wheel speed signal VR1 and simultaneously, the level of said wheel acceleration signal VwF or VwR is lower than the level of said first reference wheel deceleration signal −Vw3 and (2) when the level of said wheel speed signal VwF or VwR is lower than the level of said second reference wheel speed signal VR2 or VR'2 and simultaneously, the level of said wheel acceleration signal VwF or VwR is lower than the level of said first reference wheel acceleration signal Vw1.

5. A method as claimed in claim 4 wherein the brake device is further controlled so that when the rear wheel speed signal VwR is lower than the second reference wheel speed signal Vr'2 and simultaneously, the rear wheel acceleration signal VwR is lower than the first reference wheel deceleration signal −Vw3, the braking torque for the rear wheels is reduced.

6. A method as claimed in claim 4 or 5 wherein the reduction of the braking torque for the front and rear wheels is effected intermittently.

7. A method as claimed in claim 6 wherein the front wheel acceleration signal VwF and the rear wheel acceleration signal VwR are compared with a second reference wheel deceleration signal −Vw4 set at a negative value, the absolute value of which is larger than that of said reference wheel deceleration signal −Vw3, and when the value of the front wheel acceleration signal VwF or the rear wheel acceleration signal VwR is lower than said second reference wheel deceleration signal −Vw4, the braking torque for the front or rear wheels is reduced continuously.

8. Apparatus for controlling an anti-skid brake system in a vehicle having front and rear wheels, which comprises means for producing a front wheel speed signal VwF indicating the peripheral speed of a front wheel, means for producing a rear wheel speed signal VwR indicating the peripheral speed of a rear wheel, means for producing a vehicle speed signal V corresponding to the higher value of the front wheel speed signal VwF and the rear wheel speed signal VwR, means for producing a first reference wheel speed signal VR1, the value of which is lower than the vehicle speed signal V, means for producing a second reference wheel speed signal VR2 by reducing the vehicle speed signal V by the slip rate of the wheels, the value of said second reference wheel speed signal VR2 being lower than said first reference wheel speed signal VR1, means for producing a front wheel acceleration signal VwF indicating the peripheral acceleration of the front wheel, means for producing a rear wheel acceleration signal VwR indicating the peripheral acceleration of the rear wheel, means for producing a first reference wheel acceleration signal Vw1 indicating a predetermined positive wheel acceleration, means for producing a second reference wheel acceleration signal Vw2, the value of which is higher than said first reference wheel acceleration signal, means for producing a reference wheel deceleration signal $-Vw3$ indicating a predetermined negative wheel acceleration, means for comparing signals VwF and VwR at the time of braking of the vehicle respectively with signals VR1 and VR2, means for comparing signals VwF and VwR respectively with signals Vw1, Vw2 and Vw3, and control means for reducing the braking torque on the front wheel or rear wheel when (1) the front wheel speed signal VwF or rear wheel speed signal VwR is lower than the first reference wheel speed signal VR1 and higher than the second reference wheel speed signal VR2 and the front wheel acceleration signal VwF or rear wheel acceleration signal VwR is lower than the reference wheel deceleration signal $-Vw3$, and (2) when the front wheel speed signal VwF or rear wheel speed signal VwR is lower than the second reference wheel speed signal VR2, until the front wheel acceleration signal VwF or rear wheel acceleration signal VwR becomes higher than the first reference wheel acceleration signal Vw1.

9. Apparatus as claimed in claim 8 wherein said control means includes oscillator means for reducing the braking torque intermittently.

10. Apparatus as claimed in claim 9 comprising means for producing a second reference wheel deceleration signal $-Vw4$ whose absolute value is larger than that of said reference wheel deceleration signal $-Vw3$, and means for comparing the front wheel acceleration signal VwF and the rear wheel acceleration signal VwR respectively with signal $-Vw4$, said control means including further means for reducing the braking torque for the front or rear wheels continuously when the front wheel acceleration signal VwF or the rear wheel acceleration signal VwR is respectively lower than said second reference wheel deceleration signal $-Vw4$.

11. Apparatus for controlling an anti-skid brake system in a vehicle having front and rear wheels and left and right sides, which comprises means for sensing the peripheral speeds of the front and rear wheels at the left or right side of the vehicle, means for converting said peripheral speeds as a front wheel speed signal VwF and a rear wheel speed signal VwR, means for producing estimated vehicle speed signals VF and VR and front wheel and rear wheel acceleration signals VwF and VwR from said wheel speed signals VwF and VwR, means for producing a first reference wheel acceleration signal Vw1 and a first reference deceleration signal $-Vw3$, means for producing a first reference wheel speed signal VR1 by associating with a pre-determined slip rate, said estimated vehicle speed signals VF and VR, means for producing second reference wheel speed signals VR2 and VR'2 by associating said estimated vehicle speed signal VF with a slip rate higher than the slip rate for the first reference wheel speed signal VR1, means for comparing said front and rear speed signals VwF and VwR with said first reference wheel speed signal VR1 and said second reference wheel speed signals VR2 and VR'2 at the time of braking the vehicle, means for comparing said front and rear wheel acceleration signals VwF and VwR with said first reference wheel acceleration signal Vw1 and said first reference wheel deceleration signal $-Vw3$, and control means for reducing the braking torque on the front or rear wheels when said wheel speed signal VwF or VwR is lower than said first reference wheel speed signal VR1 and simultaneously, said wheel acceleration signal VwF or VwR is lower than said first reference wheel deceleration signal $-Vw3$ or when said wheel speed signal VwF or VwR is lower than said second reference wheel speed signal VR2 and VR'2 and simultaneously, said wheel acceleration signals VwF or VwR is lower than said first reference wheel acceleration signal Vw1.

12. Apparatus as claimed in claim 11, wherein said control means is further operative such that when said rear wheel speed signal VwR is lower than second reference wheel speed signal VR'2 and simultaneously, said rear wheel acceleration signal VwR is lower than said first reference wheel deceleration signal $-Vw3$, the braking torque for the rear wheels is reduced.

13. Apparatus as claimed in claim 11 or 12 wherein said control means includes oscillator means for reducing the braking torque intermittently.

14. Apparatus as claimed in claim 13 comprising means for producing a second reference wheel deceleration signal $-Vw4$ whose absolute value is larger than that of said reference wheel deceleration signal $-Vw3$, and means for comparing the front wheel acceleration signal VwF and the rear wheel acceleration signal VwR respectively with signal $-Vw4$, said control means including further means for reducing the braking torque for the front or rear wheels continuously when the front wheel acceleration signal VwF or the rear wheel acceleration signal VwR is respectively lower than said second reference wheel deceleration signal $-Vw4$.

* * * * *